US010147104B1

(12) United States Patent
Gregory et al.

(10) Patent No.: US 10,147,104 B1
(45) Date of Patent: Dec. 4, 2018

(54) METHOD, APPARATUS, AND COMPUTER PROGRAM PRODUCT FOR PROVIDING A SEARCH FEEDBACK SYSTEM

(71) Applicant: Groupon, Inc., Chicago, IL (US)

(72) Inventors: Greyson Gregory, Chicago, IL (US); Vincenzo Mannino, Chicago, IL (US); Alex Lester, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 730 days.

(21) Appl. No.: 14/106,203

(22) Filed: Dec. 13, 2013

(51) Int. Cl.
*G06Q 30/02* (2012.01)
(52) U.S. Cl.
CPC ..... *G06Q 30/0202* (2013.01); *G06Q 30/0256* (2013.01)
(58) Field of Classification Search
CPC .................................................. G06Q 30/02
See application file for complete search history.

(56) References Cited

U.S. PATENT DOCUMENTS

| 7,769,628 | B2* | 8/2010 | Mathews | G06Q 10/06 705/7.31 |
| 8,355,948 | B2 | 1/2013 | Mason | |
| 2005/0187818 | A1* | 8/2005 | Zito | G06Q 30/02 705/14.52 |
| 2007/0087831 | A1* | 4/2007 | Van Luchene | A63F 13/12 463/42 |
| 2009/0177540 | A1* | 7/2009 | Quatse | G06Q 30/02 705/14.26 |
| 2012/0239504 | A1* | 9/2012 | Curlander | G06Q 30/02 705/14.66 |
| 2013/0185147 | A1* | 7/2013 | Letca | G06Q 30/0241 705/14.47 |
| 2013/0290172 | A1* | 10/2013 | Mashinsky | G06Q 20/12 705/39 |
| 2013/0346157 | A1* | 12/2013 | Avrilionis | G06Q 30/0206 705/7.35 |
| 2014/0025467 | A1* | 1/2014 | Nagarajan | G06Q 30/02 705/14.26 |

OTHER PUBLICATIONS

In re: O'Brien; U.S. Appl. titled Relevance System for Consumer Deals; U.S. Appl. No. 13/411,502, filed Mar. 2, 2012.

(Continued)

*Primary Examiner* — Kurtis Gills
(74) *Attorney, Agent, or Firm* — Alston & Bird LLP

(57) ABSTRACT

Provided herein are systems, methods and computer readable media for receiving consumer search data, aggregating by consumer and location, and utilizing the aggregated consumer search data in demand forecasting and relevance determination. An example method may include receiving consumer search data, the consumer search data indicative of search performed by a consumer, the consumer search data comprising one or more search terms and at least one of a consumer location or consumer identification information, storing the consumer search data for a predetermined time interval, and providing at least one of consumer aggregated search data to a relevance module for determining which of a plurality of promotions to present to a consumer at a second time or providing location aggregated search data to a demand forecasting module for utilization in forecasting promotion demand in a particular location.

12 Claims, 9 Drawing Sheets

(56) References Cited

OTHER PUBLICATIONS

In re: Aggarwal; U.S. Appl. titled Promotion Offering System; U.S. Appl. No. 13/829,581, filed Mar. 14, 2013.
In re: Shariff; U.S. Appl. titled Method, Apparatus, and Computer Program Product for Forecasting Demand; U.S. Appl. No. 13/826,333, filed Mar. 14, 2013.
In re: Shariff; U.S. Appl. Titled Method, Apparatus, and Computer Program Product for Sales Pipeline Automation; U.S. Appl. No. 13/803,445, filed Mar. 14, 2013.
In re: Shariff; U.S. Appl. Titled Method and Apparatus for Matching Subscriber Demand with Merchant/Inventory Supply; U.S. Appl. No. 61/730,046, filed Nov. 26, 2012.
In re: Fulghum; U.S. Appl. Titled Pull-Type Searching System; U.S. Appl. No. 13/842,379, filed Mar. 15, 2013.
In re: Guo; U.S. Appl. Titled Method, Apparatus, and Computer Program Product for Consumer Tracking; U.S. Appl. No. 14/039,473, filed Sep. 27, 2013.

\* cited by examiner

METHOD, APPARATUS, AND COMPUTER PROGRAM PRODUCT FOR PROVIDING A SEARCH FEEDBACK SYSTEM

FIELD

Embodiments of the invention relate, generally, to receiving consumer search data, aggregating by consumer and/or location, and utilizing searched attributes associated with at least one of a consumer or location for improved demand forecasting or relevance determination.

BACKGROUND

Various technologies and techniques exist for utilizing consumer search history information. Applicant has identified a variety of problems associated with such conventional technologies and techniques. Through applied effort, ingenuity, and innovation, Applicant has identified various solutions to these problems that are embodied by various embodiments of the invention as herein described.

BRIEF SUMMARY

In general, embodiments of the present invention provided herein include systems, methods and computer readable media for the receiving consumer search data, aggregating by consumer and/or location, and utilizing searched attributes associated with at least one of a consumer or location for improved demand forecasting or relevance determination.

In some embodiments, a method may be provided, the method comprising generating a first ranking of promotions for presentation to a consumer, wherein each of the promotions is associated with attributes, and wherein the first ranking is generated based on correlating preferred attributes accessed from a consumer profile of the consumer to the attributes of each of the promotions, receiving searched attributes associated with the consumer, and generating a second ranking of promotions for presentation to the consumer, wherein the second ranking is generated based on the correlating the preferred attributes accessed from the consumer profile and the searched attributes to the attributes of each of the promotions.

In some embodiments, the method may further comprise outputting at least a portion of the second ranking of promotions via an impression, and wherein the promotions comprise an agreement for a particular provider to provide a service or good to the consumer. In some embodiments, the method may further comprise comparing the second ranking of promotions to a relevancy threshold, and selecting at least a portion of the second ranking for output based on the comparison. In some embodiments, the method may further comprise receiving a web page or application request from a client device, preceding the generation of the first ranking, and in an instance in which a consumer is not logged in, accessing a consumer location, generating the consumer profile comprising the consumer location, and associating subsequently identified searched attributes with the consumer profile.

In some embodiments, a method may be provided, the method comprising generating a virtual offer for one or more combinations of a category or sub-category, location, and price range, accessing, for each of one or more consumers, consumer data accessed from a consumer profile of the consumer, wherein the consumer data comprises searched attributes associated with the consumer, calculating a probability that a particular consumer would buy a particular offer in a particular time frame for at least a portion of the plurality of consumers and for each of the virtual offers, and determining an estimated number of units to be sold for at least a portion of the one or more virtual offers as a function of at least the probability associated with each of the one or more virtual offers.

In some embodiments, the method may further comprise adjusting the estimated number of units to be sold for at least a portion of the one or more virtual offers based on the searched attributes associated with the particular location. In some embodiments, the method may further comprise subsequent to calculating the probability, generating a ranking of the calculated probability calculations, and comparing the ranking to a relevancy threshold, and determining the estimated number of units to be sold for a portion meeting or exceeding the relevancy threshold. In some embodiments, the method may further comprise subsequent to calculating the probability, generating a ranking of the calculated probability calculations, and comparing the ranking to a pre-selected portfolio mix, and determining the estimated number of units to be sold for a portion based on the ranking and the pre-selected portfolio mix In some embodiments, a method may be provided, the method comprising receiving searched attributes associated with a consumer, generating a ranking of promotions for presentation to the consumer, wherein the ranking is generated based on correlating the searched attributes to attributes of each promotion, and correlating a consumer location to attributes of each promotion, comparing the ranking of promotions to a relevancy threshold, and determining a proposed promotion based on the searched attributes if the ranking of promotions does not satisfy the relevancy threshold. In some embodiments, the generating of the ranking of promotions for presentation to the consumer is further based on correlating preferred attributes accessed from a consumer profile of the consumer. In some embodiments, the method may further comprise outputting the proposed promotion via an impression, and wherein the promotions comprise an agreement for a particular provider to provide a service or good to the consumer.

In some embodiments, a method may be provided, the method comprising receiving consumer search data, the consumer search data indicative of search performed by a consumer, the consumer search data comprising one or more searched attributes and at least one of a location or consumer identification information, generating at least one of searched attributes associated with a consumer aggregated by consumer or searched attributes associated with a particular location aggregated by location, the at least one of searched attributes associated with the consumer aggregated by consumer or searched attributes associated with a particular location aggregated by location configured to indicate a consumer identification information associated with the searched attributes associated with the consumer or a location or hyper-location associated with the searched attributes associated with the location, respectively, and providing access to or the searched attributes associated with a consumer or the searched attributes associated with a location, in response to an indication of at least one of the consumer identification information or the location associated with the searched attributes associated with a consumer or searched attributes associated with a location.

In some embodiments, a device may be provided, the device comprising processing circuitry configured to generate a first ranking of promotions for presentation to a consumer, wherein each of the promotions is associated with attributes, and wherein the first ranking is generated based on correlate preferred attributes accessed from a consumer profile of the consumer to the attributes of each of the promotions, receive searched attributes associated with the consumer, and generate a second ranking of promotions for presentation to the consumer, wherein the second ranking is generated based on the correlating the preferred attributes accessed from the consumer profile and the searched attributes to the attributes of each of the promotions.

In some embodiments, the device further comprising processing circuitry configured to output at least a portion of the second ranking of promotions via an impression, and wherein the promotions comprise an agreement for a particular provider to provide a service or good to the consumer. In some embodiments, the device further comprising processing circuitry configured to compare the second ranking of promotions to a relevancy threshold, and select at least a portion of the second ranking for output based on the comparison. In some embodiments, the device further comprising processing circuitry configured to receive a web page or application request from a client device, preceding the generation of the first ranking, and in an instance in which a consumer is not logged in, access a consumer location, generate the consumer profile comprising the consumer location, and associate subsequently identified searched attributes with the consumer profile.

In some embodiments, a device may be provided, the device comprising processing circuitry configured to generate a virtual offer for one or more combinations of a category or sub-category, location, and price range, access, for each of one or more consumers, consumer data accessed from a consumer profile of the consumer, wherein the consumer data comprises searched attributes associated with the consumer, calculate a probability that a particular consumer would buy a particular offer in a particular time frame for at least a portion of the plurality of consumers and for each of the virtual offers, and determine an estimated number of units to be sold for at least a portion of the one or more virtual offers as a function of at least the probability associated with each of the one or more virtual offers.

In some embodiments, the device further comprising processing circuitry configured to receive searched attributes associated with a particular location, adjust the estimated number of units to be sold for at least a portion of the one or more virtual offers based on the searched attributes associated with the particular location. In some embodiments, the device further comprising processing circuitry configured to subsequent to calculating the probability, generate a ranking of the calculated probability calculations, and compare the ranking to a relevancy threshold, and determine the estimated number of units to be sold for a portion meeting or exceeding the relevancy threshold. In some embodiments, the device further comprising processing circuitry configured to subsequent to calculating the probability, generate a ranking of the calculated probability calculations, and compare the ranking to a pre-selected portfolio mix, and determine the estimated number of units to be sold for a portion based on the ranking and the pre-selected portfolio mix In some embodiments, a device may be provided, the device comprising processing circuitry configured to receive searched attributes associated with a consumer, generate a ranking of promotions for presentation to the consumer, wherein the ranking is generated based on correlate the searched attributes to attributes of each promotion, and correlate a consumer location to attributes of each promotion, compare the ranking of promotions to a relevancy threshold, and determine a proposed promotion based on the searched attributes if the ranking of promotions does not satisfy the relevancy threshold.

In some embodiments, the generating of the ranking of promotions for presentation to the consumer is further based on correlating preferred attributes accessed from a consumer profile of the consumer. In some embodiments, the device further comprising processing circuitry configured to output the proposed promotion via an impression, and wherein the promotions comprise an agreement for a particular provider to provide a service or good to the consumer.

In some embodiments, a device may be provided, the device comprising processing circuitry configured to receive consumer search data, the consumer search data indicative of search performed by a consumer, the consumer search data comprising one or more searched attributes and at least one of a location or consumer identification information, generate at least one of searched attributes associated with a consumer aggregated by consumer or searched attributes associated with a particular location aggregated by location, the at least one of searched attributes associated with the consumer aggregated by consumer or searched attributes associated with a particular location aggregated by location configured to indicate a consumer identification information associated with the searched attributes associated with the consumer or a location or hyper-location associated with the searched attributes associated with the location, respectively, and provide access to or the searched attributes associated with a consumer or the searched attributes associated with a location, in response to an indication of at least one of the consumer identification information or the location associated with the searched attributes associated with a consumer or searched attributes associated with a location.

In some embodiments, a computer program product may be provided, the computer program product comprising at least one computer-readable storage medium having computer-executable program code instructions stored therein, the computer-executable program code instructions comprising program code instructions for generating a first ranking of promotions for presentation to a consumer, wherein each of the promotions is associated with attributes, and wherein the first ranking is generated based on correlating preferred attributes accessed from a consumer profile of the consumer to the attributes of each of the promotions, receiving searched attributes associated with the consumer, and generating a second ranking of promotions for presentation to the consumer, wherein the second ranking is generated based on the correlating the preferred attributes accessed from the consumer profile and the searched attributes to the attributes of each of the promotions.

In some embodiments, the computer-executable program code instructions further comprise program code instructions for outputting at least a portion of the second ranking of promotions via an impression, and wherein the promotions comprise an agreement for a particular provider to provide a service or good to the consumer. In some embodiments, the computer-executable program code instructions further comprise program code instructions for comparing the second ranking of promotions to a relevancy threshold, and selecting at least a portion of the second ranking for output based on the comparison. In some embodiments, the computer-executable program code instructions further comprise program code instructions for receiving a web page or application request from a client device, preceding the generation of the first ranking, and in an instance in which a consumer is not logged in, accessing a consumer location, generating the consumer profile comprising the consumer location, and associating subsequently identified searched attributes with the consumer profile.

In some embodiments, a computer program product may be provided, the computer program product comprising at least one computer-readable storage medium having computer-executable program code instructions stored therein, the computer-executable program code instructions comprising program code instructions for generating a virtual offer for one or more combinations of a category or subcategory, location, and price range, accessing, for each of one or more consumers, consumer data accessed from a consumer profile of the consumer, wherein the consumer data comprises searched attributes associated with the consumer, calculating a probability that a particular consumer would buy a particular offer in a particular time frame for at least a portion of the plurality of consumers and for each of the virtual offers, and determining an estimated number of units to be sold for at least a portion of the one or more virtual offers as a function of at least the probability associated with each of the one or more virtual offers.

In some embodiments, the computer-executable program code instructions further comprise program code instructions for receiving searched attributes associated with a particular location, adjusting the estimated number of units to be sold for at least a portion of the one or more virtual offers based on the searched attributes associated with the particular location. In some embodiments, the computer-executable program code instructions further comprise program code instructions for subsequent to calculating the probability, generating a ranking of the calculated probability calculations, and comparing the ranking to a relevancy threshold, and determining the estimated number of units to be sold for a portion meeting or exceeding the relevancy threshold. In some embodiments, the computer-executable program code instructions further comprise program code instructions for subsequent to calculating the probability, generating a ranking of the calculated probability calculations, and comparing the ranking to a pre-selected portfolio mix, and determining the estimated number of units to be sold for a portion based on the ranking and the pre-selected portfolio mix.

In some embodiments, a computer program product may be provided, the computer program product comprising at least one computer-readable storage medium having computer-executable program code instructions stored therein, the computer-executable program code instructions comprising program code instructions for receiving searched attributes associated with a consumer, generating a ranking of promotions for presentation to the consumer, wherein the ranking is generated based on correlating the searched attributes to attributes of each promotion, and correlating a consumer location to attributes of each promotion, comparing the ranking of promotions to a relevancy threshold, and determining a proposed promotion based on the searched attributes if the ranking of promotions does not satisfy the relevancy threshold.

In some embodiments, the generating of the ranking of promotions for presentation to the consumer is further based on correlating preferred attributes accessed from a consumer profile of the consumer. In some embodiments, the computer-executable program code instructions further comprise program code instructions for outputting the proposed promotion via an impression, and wherein the promotions comprise an agreement for a particular provider to provide a service or good to the consumer.

In some embodiments, a computer program product may be provided, the computer program product comprising at least one computer-readable storage medium having computer-executable program code instructions stored therein, the computer-executable program code instructions comprising program code instructions for receiving consumer search data, the consumer search data indicative of search performed by a consumer, the consumer search data comprising one or more searched attributes and at least one of a location or consumer identification information, generating at least one of searched attributes associated with a consumer aggregated by consumer or searched attributes associated with a particular location aggregated by location, the at least one of searched attributes associated with the consumer aggregated by consumer or searched attributes associated with a particular location aggregated by location configured to indicate a consumer identification information associated with the searched attributes associated with the consumer or a location or hyper-location associated with the searched attributes associated with the location, respectively, and providing access to or the searched attributes associated with a consumer or the searched attributes associated with a location, in response to an indication of at least one of the consumer identification information or the location associated with the searched attributes associated with a consumer or searched attributes associated with a location.

In some embodiments, a system may be provided, the system comprising a receiving module for consumer search data, the consumer search data indicative of search performed by a consumer, the consumer search data comprising one or more searched attributes and at least one of a location or consumer identification information, a processing module for generating at least one of searched attributes associated with a consumer aggregated by consumer or searched attributes associated with a particular location aggregated by location, the at least one of searched attributes associated with the consumer aggregated by consumer or searched attributes associated with a particular location aggregated by location configured to indicate a consumer identification information associated with the searched attributes associated with the consumer or a location or hyper-location associated with the searched attributes associated with the location, respectively, and a database for providing access to the searched attributes associated with a consumer or the searched attributes associated with a location, in response to an indication of at least one of the consumer identification information or the location associated with the searched attributes associated with a consumer or searched attributes associated with a location.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
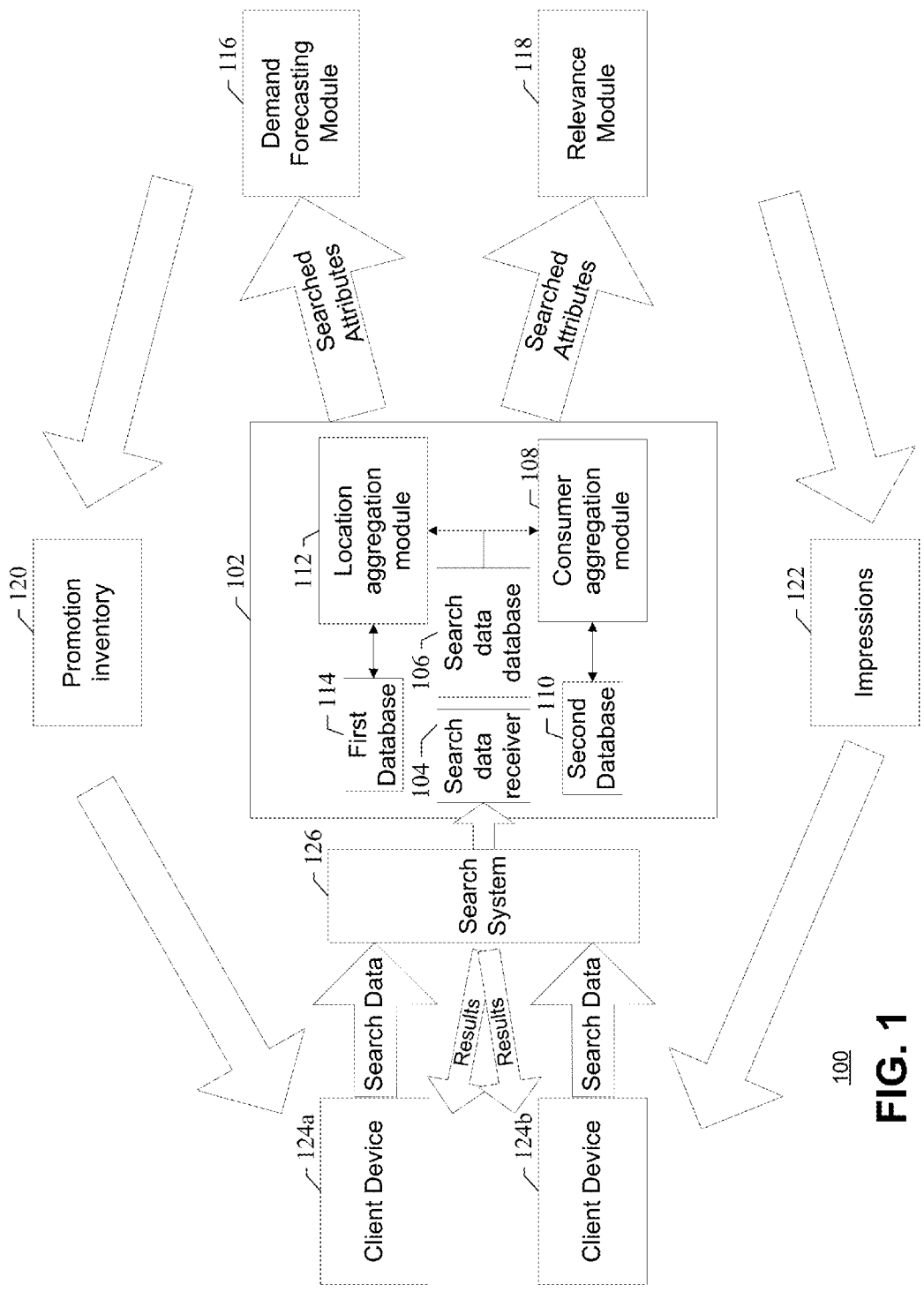
FIG. 1 is block diagram of a consumer tracking system that is configured to track, store, and access consumer search data in accordance with an example embodiment.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Definitions

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

In some embodiments, a host system may be implemented as a promotional system to offer promotions to a consumer. A promotion and marketing service may utilize a host system, such as a promotional system, to offer such promotions. A "promotion and marketing service" may provide promotion and/or marketing services on behalf of one or more providers (e.g., one or more merchants, retailers, etc.) that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

A "promotion" may be a deal purchased by a consumer from a promotional system, and may be considered an agreement for a particular provider to provide a service or good (e.g., a discounted service or good) to the consumer. A promotion may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion may be a deal offer whereby a running shoes company or intermediary (e.g., promotion provider) offers $50 of value toward the purchase of running shoes in exchange for $25. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running shoes company promotion as an example, the accepted value is $25 and the promotional value is $50. In this example, the residual value may be equal to the accepted value.

An "instrument" associated with a promotion may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as an accepted value, a promotional value and/or a residual value. For example, using the aforementioned running shoes company as the example provider, an electronic indication in a mobile application that shows $50 of value to spend at the running shoes company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

A "provider" may be considered a merchant, retailer, or other provider of goods or services that offers a promotion, as agreed upon with the promotion and marketing service affiliated with the promotional system. A provider may include, but is not limited to, a merchant, business owner, consigner, shopkeeper, tradesperson, vender, operator, entrepreneur, agent, dealer, retailer, organization or the like that is in the business of a providing a good, service or experience to a consumer, facilitating the provision of a good, service or experience to a consumer and/or otherwise operating in the stream of commerce. For example, a provider may take the form of a running shoes company that sells attire that is generally used by a person who runs or participates in athletic activities.

An "impression" may be considered a communication advertising an offer to purchase a promotion from a promotional system. An impression may include a communication, a display, or other perceived indication, such as a flyer, print media, email, text message, application alert, mobile applications, other type of electronic interface or distribution channel and/or the like, of one or more promotions. For example, and using the aforementioned running company as the example provider, an email communication sent to consumers that indicates the availability of a $25 for $50 toward running shoes promotion.

Impressions are therefore provided to "consumers," including, but not limited to, a client, customer, purchaser, shopper, user of the promotional system or the like who may be in the position to or does exchange value for one or more instruments under the terms defined by the one or promotions. For example, and using the aforementioned running shoes company as the example provider, an individual who is interested in purchasing running shoes. A "consumer" may be identified by one or more profiles, or sub-profiles, where each profile or sub-profile includes one or more consumer attribute that describes the consumer. Consumer attributes may include, but are not limited to, the consumer's name, consumer's age, consumer's location (e.g., "home", "work", or other visited places such as future vacation locations, cities that friends and/or family live in locations, business trip locations and the like), consumer's gender, consumer's tenure using the promotion system, consumer's email domain, consumer's IP address, consumer's occupation, consumer's educational background, consumer's previously accepted and/or rejected promotion program offerings, consumer's gender and the like. The consumer attributes may be inputted into the consumer's profile by the consumer, or collected by components within the promotion system 100 and inputted into the consumer's profile.

Analyzing "explicit data," such as user-provided data in user profiles, preferences, and/or promotion purchase history, for example, may allow the promotional system to better target promotion types or impressions to consumers. A consumer may be more likely to purchase a promotion if the impression advertising the promotion is of interest to the consumer than if the associated promotion was selected at random.

Additionally or alternatively, accessing "implicit data," data that may be user-provided for a purpose other than for use on the promotional system and/or detected by the promotional system, may allow a promotional system to gather information on consumer behaviors, preferences and preferred locations. Example implicit data may include data indicative of a consumer's browsing and/or search history, detected location, or the consumer's social network profile information, for example.

A "client device" may be a device or module operable to access a website (e.g., perhaps using a web browser) or execute a mobile application, such as a laptop, mobile phone, tablet, personal computer, or the like. A client device may place a request, such as in response to a consumer activity facilitated by a user interface such as, without limitation, clicking a link, selecting particular text or image data, and/or inputting or entering data.

A "search" may include operations performed by a consumer or other user via a client device, wherein text, parameters, tags, or other terms are searched against one or more electronically stored documents, data entries, records, files, or the like. In some embodiments, a "search" may be performed by navigating a hierarchical data structure, such as a data structure organized by location/hyper-location or category/sub-category. In some embodiments, portions of a search string may be pre-populated (e.g., a location or hyper-location portion) by the client device or other processing circuitry. In some embodiments, a search may be performed using a single field or any array of fields.

The search may be executed by a "search system" running on the client device, which may include a search engine configured to search for information on the World Wide Web (www) or on a remote server. In some embodiments, the "search engine" may be configured to search for information hosted via a website or a web server of an application, and to provide "search results." "Search results" may be transmitted or otherwise provided for display to the consumer or other user via the client device as a list of information (e.g., list of web pages, images or the like) related to the search. The search system may be configured such that particular promotions may be offered to consumers based on relevance determinations. For example, U.S. patent application Ser. No. 13/829,581, which is entitled "Promotion Offering System", was filed Mar. 14, 2013, and which is hereby incorporated by reference in its entirety, algorithms are disclosed for providing consumers relevant promotions in response to consumer initiated searches.

"Consumer search data" may include one or more search terms (e.g., text, characters, etc.) that are input by consumers into an interface (e.g., one or more fields displayed by a graphical user interface) of the search system. The consumer search data is used by the search system, perhaps in connection with other data or terms (e.g., pre-populated data, categories, etc.), to execute the search. In some embodiments, consumer search data is stored with an association to consumer identification information (e.g., a consumer ID).

Consumer search data may be translated or otherwise identified by the search system as "searched attributes". "Searched attributes" may be parts of a promotion to which the consumer search data is translated or converted to. For example, if a consumer searches "Chinese restaurant", "Chinese restaurant" may be the consumer search data. Embodiments of the present invention may store a "searched attribute" for one or more of a category (e.g., "food and drink"), a sub-category (e.g., "Asian cuisine"), a deal type (e.g., "date night") or the like. In some embodiments, translation to "searched attributes" is performed in the case of misspellings (e.g., "cinese restaurant"), partial input (e.g., "Chinese rest"), or the like.

A "consumer ID" may include information or data for identifying a consumer such as, for example, a username, password, user ID, login name, sign-in name, unique name, email address, pin number, account number, identification number, IP address, and the like.

"Aggregation" refers to processes whereby data is gathered, consolidated, formatted, stored, and expressed in summary form or a common format. "Aggregation" by consumer or "consumer aggregation" may refer to gathering, consolidating, formatting, storing, and expressing data (e.g., searched attributes) associated to a particular consumer or consumer ID. For example, consumer aggregation may include accessing or expressing consumer search data or searched attributes associated with the consumer (or consumer ID) received from the search system or from a particular client device. Similarly, aggregation by location or location aggregation may refer to gathering, consolidating, formatting, storing, and expressing data (e.g., consumer search data or searched attributes) associated with a particular location (e.g., Chicago) or hyper-location (e.g., Wrigleyville neighborhood of Chicago).

"Forecasting demand" may include or otherwise enable a prediction of those offers that a consumer (e.g., a client, customer, purchaser, shopper, user or the like who may be in the position to or does exchange value for one or more offers) will likely purchase, if offered, and, as such, enables the prioritization of promotions associated with such offers. Forecasting demand may further facilitate the prediction of those promotions or associated offers which may result in greater interest, revenue, higher margin, offer diversity and/or the like.

"Determining relevance" may include determining which of a plurality of consumer promotions to present to a consumer. The plurality of consumer promotions may be for goods and or for services.

Brief Overview

The methods, apparatus and computer program products described herein are operable for the receiving consumer search data and providing searched attributes associated with at least one of a consumer or location in order to improve relevance determination and demand forecasting. Consumer search data is received and may be aggregated by consumer, by location, or by a combination thereof. Searched attributes associated with a consumer may be provided to a relevance module of a host system (e.g., a promotion and marketing system), the relevance module being configured to provide consumers with relevant impressions. Consumer search data may further be aggregated by location and provided to a demand forecasting module of a host system, the demand forecasting module configured to calculate consumer demand.

In some embodiments, the host system may be configured such that particular promotions may be offered to consumers based on relevance determinations. Using search attributes associated with a consumer, intelligent selection or ranking of promotions to present to the consumer is enabled. For example, the promotion offering system may utilize one or more of the promotion and consumer attributes, promotion categories/sub-categories, consumer profile, consumer-focused deal type and the like. In so doing, the consumer is more likely to be interested in the presented promotions.

In each of U.S. patent application Ser. No. 13/411,502, filed Mar. 2, 2012, titled "RELEVANCE SYSTEM FOR CONSUMER DEALS", U.S. patent application Ser. No. 13/829,581 entitled "Promotion Offering System" and filed on Mar. 14, 2013, U.S. patent application Ser. No. 12/776,028, now U.S. Pat. No. 8,355,948, titled "SYSTEM AND METHODS FOR DISCOUNT RETAILING" filed on May 7, 2010, each of which is hereby incorporated by reference in its entirety, algorithms are provided for matching consumers to relevant promotions.

In various embodiments, the host system may be configured such that, using searched attributes, for example, associated with a particular location, demand for particular promotions may be determined. In each of U.S. patent application Ser. No. 13/826,333, filed Mar. 14, 2013, titled "METHOD, APPARATUS, AND COMPUTER PROGRAM PRODUCT FOR DEMAND FORECASTING", U.S. patent application Ser. No. 13/803,445, filed Mar. 14, 2013, titled "METHOD, APPARATUS, AND COMPUTER PROGRAM PRODUCT FOR SALES PIPELINE AUTOMATION", and U.S. Provisional Patent Application No. 61/730,046, titled "METHOD AND APPARATUS FOR MATCHING SUBSCRIBER DEMAND WITH MERCHANT/INVENTORY SUPPLY" filed on Nov. 26, 2012", each of which is hereby incorporated by reference in its entirety, algorithms are provided for calculating demand.

As will be apparent to one of ordinary skill in the art in view of this disclosure, consumers may access content provided by a host system in a variety of ways. For example, a consumer may use a web browser to visit a website operated by a promotion and marketing service and hosted via the host system. In addition, the consumer may use a mobile application (e.g., a software application or "app") to access promotion provider content hosted by the host system.

Various embodiments of the present invention are configured to allow the host system, and therefore the promotion and marketing service, to receive consumer search data and provide searched attributes associated with at least one of a consumer or location in such a manner to provide a consumer with more relevant impressions via improved relevance determinations and to provide the host system with improved demand forecasting. Such a system allows for the use of consumer search data for determining, specifically, what promotions an individual consumer may prefer and, in general, what promotions, consumers of a specific locality may prefer.

Specifically, various embodiments of the present invention may be configured to provide a system for making push communication (e.g., emails, alerts or the like) more relevant. In some embodiments, consumers may be alerted (e.g., via push communication) when a promotion that they have searched for becomes available, is near sell out, or the like. In some embodiments of the present invention, a system may be provided to acquire promotions from particular merchants and/or for particular goods, services, or experiences, based on unmet demand. Various embodiments of the present invention may be configured to provide a system for identifying particular promotions, categories, or the like having low demand (e.g., less than a predefined threshold), thereby alerting the promotion and marketing system where marketing improvements may be made or promotion parameters (e.g., a discount) may be adjusted, or the like.

As described in greater detail below, various embodiments of the invention provide solutions for each of the improving relevance determinations and demand forecasting. Such embodiments are further configured to receive consumer search data generated by search systems (e.g., web browser software, mobile application software) running on a client device in response to consumer search activity.

In some embodiments, the host system may achieve the above benefits by, for example, receiving each of one or more searches conducted by one or more consumers utilizing a client device configured to connect to or access a web page or execute a mobile application. The consumer search data may then be stored. A consumer search data aggregation module aggregates the searched attributes associated with one or more consumers and may then be configured to provide searched attributes associated with a particular consumer to a relevance module. A hyper-location search data aggregation module aggregates the consumer search data by location (or hyper-location) and may be configured to provide searched attributes associated with a particular location (or hyper-location) to a demand forecasting module.

Example System Architecture

FIG. 1 is a block diagram showing an exemplary search feedback system 100 for receiving consumer search data and providing searched attributes associated with at least one of a consumer or location to a relevance module 118 and/or a demand forecasting module 116. The depicted system 100 is configured to include a consumer search aggregation module 102 disposed in communication with a search system 120 and/or various client devices 124a and 124b, for example, via a network. The depicted consumer search aggregation module 102 may comprise a consumer search data receiver 104 configured to receive consumer search data from the search system 120, a search data database 106 configured to store the consumer search data, a consumer aggregation module 108 and a first database 110 for storing searched attributes associated with a consumer, and a location aggregation module 112 and a second database 114 configured to store searched attributes associated with a location.

In some embodiments, consumer search data, searched attributes associated with a consumer and searched attributes associated with a location may be stored in a single database, such as for example, search data database 106. As such, as will be apparent to one of ordinary skill in the art in view of this disclosure, the depicted system may be configured to receive consumer search data, aggregate the search data by both consumer and location (or hyper-location) perhaps in a single database having appropriate tags, store searched attributes associated with a consumer and a location, and provide the searched attributes to a demand forecasting module 116 and/or a relevance module 118.

In some embodiments, the search system may be configured, for example, to receive consumer search data, the consumer search data indicative of search performed by a consumer. The consumer search data may comprise, for example, one or more search terms and at least one of a consumer location or a consumer ID. In some embodiments, the search system may be configured, for example, to receive selection criteria for one of category of promotions or promotion type, search a promotion database for one or more results that match the selection criteria, arrange another of categories of promotions or promotion types based on the selection criteria, and communicate the one or more results and the arranged another of categories of promotions or promotion types for selection. In U.S. patent application Ser. No. 13/842,379, filed Mar. 15, 2013, titled "PULL-TYPE SEARCHING SYSTEM", which is hereby incorporated by reference in its entirety, a promotion searching system, method and computer program product are provided for receiving consumer search data and providing search results.

In some embodiments, the search data receiver is configured to receive explicit and implicit data, including, for example, consumer login information, client device ID and other data indicative of a particular consumer or a particular hyper-location and provide such data to the search data database 106. For example, in some embodiments, consumer search data may be attached to or associated with a particular consumer or consumer ID or the like, by utilizing a system for tracking, storing and retrieving consumer related data. In U.S. patent application Ser. No. 14/039,473, filed Sep. 27, 2013, titled "METHOD, APPARATUS, AND COMPUTER PROGRAM PRODUCT FOR CONSUMER TRACKING", which is hereby incorporated by reference in its entirety, a promotion searching system, method and computer program product are provided for identifying, tracking, storing and retrieving of consumer related data in order to monitor or identify mobile application and web browser activity of a consumer.

The demand forecasting module 116 may be configured to access or receive searched attributes associated with a location, such as from second database 114, and calculate a probability that a particular user would buy a particular offer in a particular time frame for at least a portion of the plurality of users and for each of the virtual offers.

In some embodiments, the demand forecasting module 116 may comprise an adjustment module, which may be configured to provide one or more adjustments based on the searched attributes, or in other embodiments, diversity, portfolio mix, price mix, hyper-local constraints, prior performance, context information or the like using, for example, a prior performance database and historical contextual information.

The demand forecasting module 116 may be configured to provide the calculated demand to a system configured for enabling the prioritization of promotions for sale to merchants and/or for offering to consumers. As such, the demanded promotions are generated and stored in a promotion inventory 120, and may then be offered back to the consumers via client device 124a as shown in FIG. 1. Client device 124a may then submit a search for a promotion or the like to the search system 120.

The relevance module 118 may be configured for generating an initial determination on whether to present the promotion to the consumer, wherein the promotion is associated with attributes (e.g., one or more deal types, one or more categories/sub-categories) accessing preferred attributes (e.g., one or more deal types, one or more categories/sub-categories) from a consumer profile of the consumer. In some embodiments, the relevance module 118 may be configured for generating a first ranking of promotions for outputting to a consumer, wherein each of the promotions is associated with attributes, and wherein the first ranking is generated based on: correlating preferred attributes accessed from a consumer profile of the consumer to the attributes of each of the promotions, receiving searched attributes associated with a consumer, receiving searched attributes associated with the consumer, generating a second ranking of promotions for presentation to the consumer, wherein the second ranking is generated based on correlating the preferred attributes accessed from the consumer profile and the searched attributes to the attributes of each of the promotions, comparing the second ranking to a relevancy threshold and outputting at least a portion of the second ranking of promotions via an impression, and wherein the promotions comprise an agreement for a particular provider to provide a service or good to the consumer.

In some embodiments, relevancy module 118 may be configured for generating a ranking of promotions for outputting to the consumer, correlating the searched attributes to attributes of each promotion, correlating a consumer location to attributes of each promotion, correlating preferred attributes accessed from a consumer profile of the consumer, comparing the ranking of promotions to a relevancy threshold, and determining a proposed promotion based on the searched attributes if the ranking of promotions does not satisfy the relevancy threshold. The relevance module 118 may then be configured to provide an impression 122 (e.g., via a targeted email, mobile application notification, or the like) to client device 124b.

System Process Overview

Figure 2A:
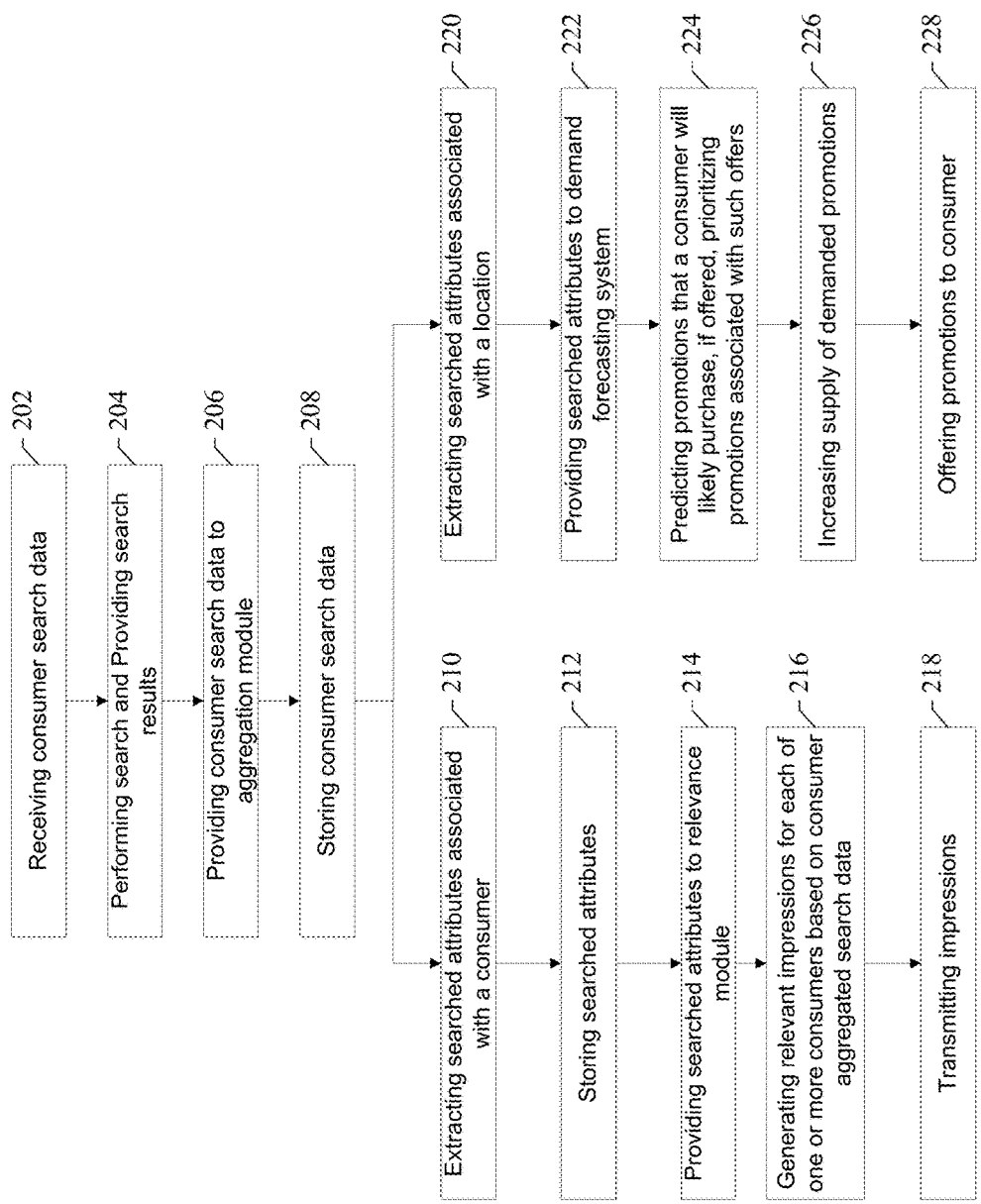
FIG. 2A is a flowchart illustrating a method that may be performed by an example search feedback system, in accordance with an example embodiment.

FIG. 2 shows an example process that may, in some embodiments, be executed by an example search feedback system 100. The exemplary process disclosed below allows various embodiments of the present invention to receive and store consumer search data, aggregate by consumer and/or location, and utilize searched attributes associated with at least one of a consumer or location to provide consumers with relevant impressions and calculate consumer demand.

As shown in block 202 of FIG. 2, an apparatus, such as system 100, may be configured for receiving consumer search data. For example, a consumer may open a web browser software application running on their home computer, tablet, or mobile phone (e.g., client device) and direct the browser to a webpage associated with the promotion and marketing service (e.g., www.Groupon.com). In other embodiments, a consumer may execute a mobile device application associated with the marketing and promotion system on their tablet or mobile phone (e.g., client device).

Figure 2B:
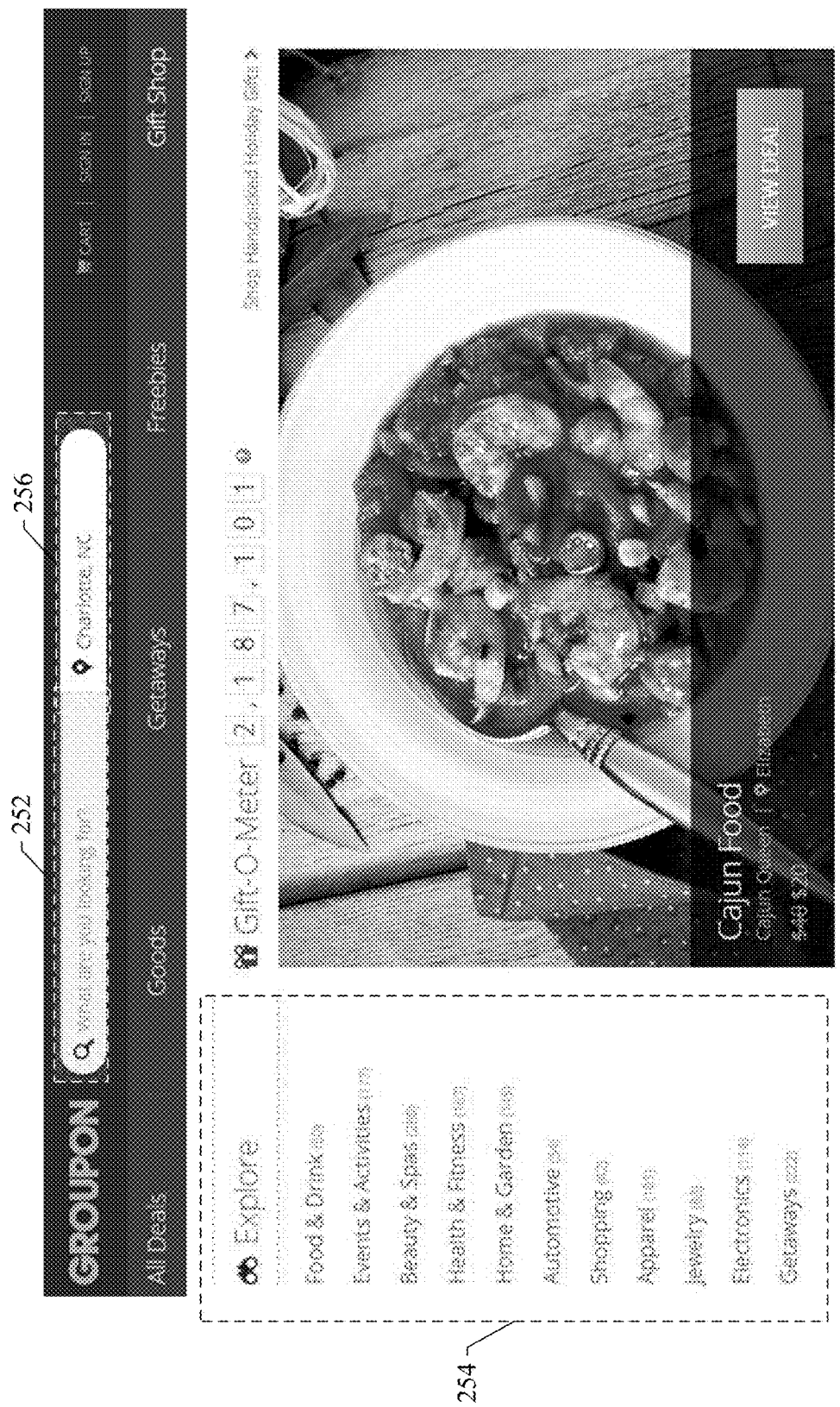
FIG. 2B shows example graphical user interface display that may be presented by various components of systems, in accordance with some embodiments.

The consumer may perform a search for a desired promotion or the like. As described above, a search may include operations performed by a consumer or other user via a client device, wherein text, parameters, tags, or other terms are searched against one or more electronically stored documents, data entries, records, files, or the like. FIG. 2B shows an exemplary display 250 that may be presented by a client device (e.g., client device 124a, client device 124b or the like) such as those used by one or more consumers for searching. While example display 250 may be configured to be shown on a monitor, similar interfaces may be utilized with other types of devices discussed herein (mobile telephone, "smart phone", laptop, tablet, or other device having similar dimensions), and modified accordingly (e.g., for screen size, input device compatibly, ease of use, etc.).

As shown, display 250 may be configured to receive input in a single field 252. Additionally or alternatively, in some embodiments, input may be received in the form of navigating a hierarchical data structure 254, such as a data structure organized by location/hyper-location or category/sub-category. Additionally, display 250 may be configured to receive input such that portions of a search string 256 may be pre-populated (e.g., a location or hyper-location portion). Once at least one of the fields has information entered, the consumer may submit the search (e.g., by selecting an icon or pressing 'enter' or the like). As such, as shown in block 204 of FIG. 2, an apparatus, such as system 100, may be configured for performing a search and providing the consumer with search results.

As shown in block 206 of FIG. 2, an apparatus, such as system 100, may be configured for providing the consumer search data to a search data aggregation module. As shown in block 208 of FIG. 2, an apparatus, such as system 100 or search data aggregation module 102, may be configured for storing the consumer search data.

The search data aggregation module may be configured for both consumer aggregation and location aggregation. As such, the system process disclosed herein may in parallel or consecutively aggregate search data by consumer and location and provide searched attributes associated with a consumer and/or location to the appropriate downstream module. As shown in block 210 of FIG. 2, an apparatus, such as system 100, may be configured for extracting searched attributes associated with one or more consumer or location. As shown in block 212 of FIG. 2, an apparatus, such as system 100, may be configured for storing searched attributes associated with a consumer. And as shown in block 206 of FIG. 2, an apparatus, such as system 100, may be configured for providing searched attributes associated with the consumer to a relevance module.

The relevance module may then perform relevance determinations, as will be described below in more detail, to transmit relevant impressions to particular consumers. As shown in block 218 of FIG. 2, an apparatus, such as system 100, may be configured for transmitting relevant impressions to a consumer.

Referring back to block 208 where consumer search data is stored to, for example, a searched data database 106, the location aggregation module may extract searched attributes associated with a particular location. For example, when a consumer enters a search, a location may be specified or identified via a cookie or the like. When a location is known by the host system or the consumer search aggregation module 102, the entire search (e.g., the collection of terms as a whole), each term of the search, or searched attributes may be associated with that location. As such, as shown in block 220 of FIG. 2, an apparatus, such as system 100, may be configured for extracting location specific consumer search data. Then, as shown in block 222 of FIG. 2, an apparatus, such as system 100, may be configured for providing searched attributes associated with a location to a demand forecasting module.

As shown in block 224 of FIG. 2, an apparatus, such as system 100, may be configured for enabling a prediction of those promotions that a consumer will likely purchase, if offered. Additionally, in some embodiments, the apparatus may be configured for enabling prioritization of promotions associated with such offers. As shown in block 226 of FIG. 2, an apparatus, such as system 100, may be configured for increasing supply of the demanded promotions. And as shown in block 228 of FIG. 2, an apparatus, such as system 100, may be configured for providing consumers with the promotions.

Various other embodiments of the present invention provide a system where consumer search data may be aggregated in other manners (e.g., by category, sub-category, or the like), making the consumer search data available for other uses and/or by other modules, not pictured.

Demand Forecasting

Figure 3:
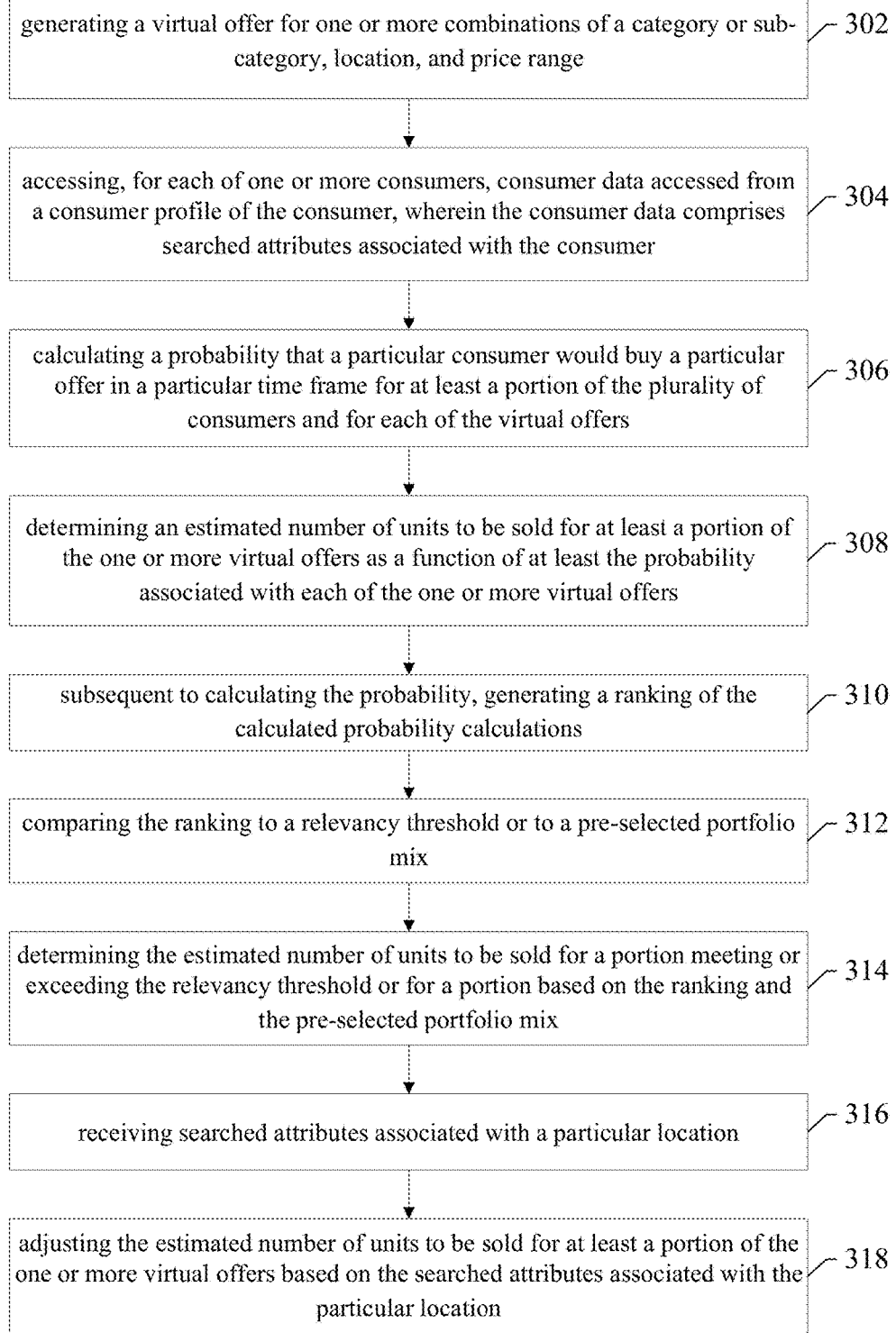
FIG. 3 is a flowchart illustrating a method for calculating a demand forecast in accordance with an example embodiment.

FIG. 3 shows an example process that may, in some embodiments, be executed by an example search feedback system 100. The exemplary process shown below allows various embodiments of the present invention to forecast demand. In some examples, the demand forecasting module 116 may be configured to determine a forecasted demand for promotions (e.g., any type of presented or otherwise indicated reward, discount, coupon, credit, deal, incentive, discount, media or the like that is indicative of an offered value or the like that upon purchase or acceptance results in the issuance of an instrument that may be used toward at least a portion of the purchase of particular goods, services and/or experiences defined by the offer).

The forecasted demand may include or otherwise enable a prediction of those offers that a consumer (e.g., a client, customer, purchaser, shopper, user or the like who may be in the position to or does exchange value for one or more offers) will likely purchase, if offered, and, as such, enables the prioritization of promotions associated with such offers. Forecasting demand may further facilitate the prediction of those promotions or associated offers which may result in greater interest, revenue, higher margin, offer diversity and/or or the like. As such, searched attributes associated with one or more consumers may be utilized in calculating a probability that a particular consumer would buy, if offered, a particular promotion.

An estimated number of units to be sold may be calculated for each promotion. In some examples, however, the estimated number of units to be sold may be adjusted, such as for example, one or more demanded offers may already be present in an inventory. In such examples, the method, apparatus and computer program product described herein is operable to modify or otherwise adjust the demand to account for a current inventory of offers. In some examples, searched attributes associated with a particular location may be utilized in determination of an adjustment. Other adjustments may also be performed, based on, for example, seasonality, economic conditions, geography, climate and/or the like.

Once a set of adjustments has been performed, in some example embodiments, one or more merchants (e.g., a provider, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce) may be identified that may provide the demanded offer. Merchants that provide the same or similar goods, services or experiences may be matched or otherwise assigned to the demanded offers. As such, a merchant may be assigned zero or more virtual offers.

Using a series of ranking metrics, the merchants may be ranked. In some examples, the ranking may be based on expected revenue, business objectives, sales timeline, sales probability, merchant diversity, offer diversity and/or the like. In some examples, the ranked list may provide an example ordering in which sales calls may be made.

The ranked list of merchants may then be programmatically assigned to one or more sales resources, such as a sales representative, a sales contractor, a marketing person or team, an email distribution list, a self-service tool, or the like. In some examples, the assignment may be dynamically modified based on current resources, need, diversity, probability to close, time to close, business objectives and/or the like, while in other examples an assignment may be removed in an instance in which there is no longer a demand for the particular service, good or experience provided by the particular merchant. Alternatively or additionally, each merchant or demanded offer may be assigned a value, in such cases the value may be suggestive of a bounty or reward system, such as a commission or a bonus for the sales resource.

In one embodiment, a method for demand forecasting is provided. As shown in block 302 of FIG. 3, an apparatus, such as a demand forecasting module 116, may be configured for generating a virtual offer for one or more combinations of a category or sub-category, location, and price range.

As shown in block 304 of FIG. 3, an apparatus, such as a demand forecasting module 116, may be configured for accessing, for each of one or more consumers, consumer data accessed from a consumer profile of the consumer, wherein the consumer data comprises searched attributes associated with the consumer. As shown in block 306 of FIG. 3, an apparatus, such as a demand forecasting module 116, may be configured for calculating a probability that a particular consumer would buy a particular offer in a particular time frame for at least a portion of the plurality of consumers and for each of the virtual offers. In some embodiments, the searched attributes associated with a consumer are utilized in calculating the probability that the consumer would buy a particular offer.

As shown in block 308 of FIG. 3, an apparatus, such as a demand forecasting module 116, may be configured for determining an estimated number of units to be sold for at least a portion of the one or more virtual offers as a function of at least the probability associated with each of the one or more virtual offers. As shown in block 310 of FIG. 3, an apparatus, such as demand forecasting module 116, may be configured for subsequent to calculating the probability, generating a ranking of the calculated probability calculations. As shown in block 312 of FIG. 3, an apparatus, such as a demand forecasting module 116, may be configured for comparing the ranking to a relevancy threshold or to a pre-selected portfolio mix.

As shown in block 314 of FIG. 3, an apparatus, such as a demand forecasting module 116, may be configured for determining the estimated number of units to be sold for a portion meeting or exceeding the relevancy threshold or for a portion based on the ranking and the pre-selected portfolio mix.

Figure 4:
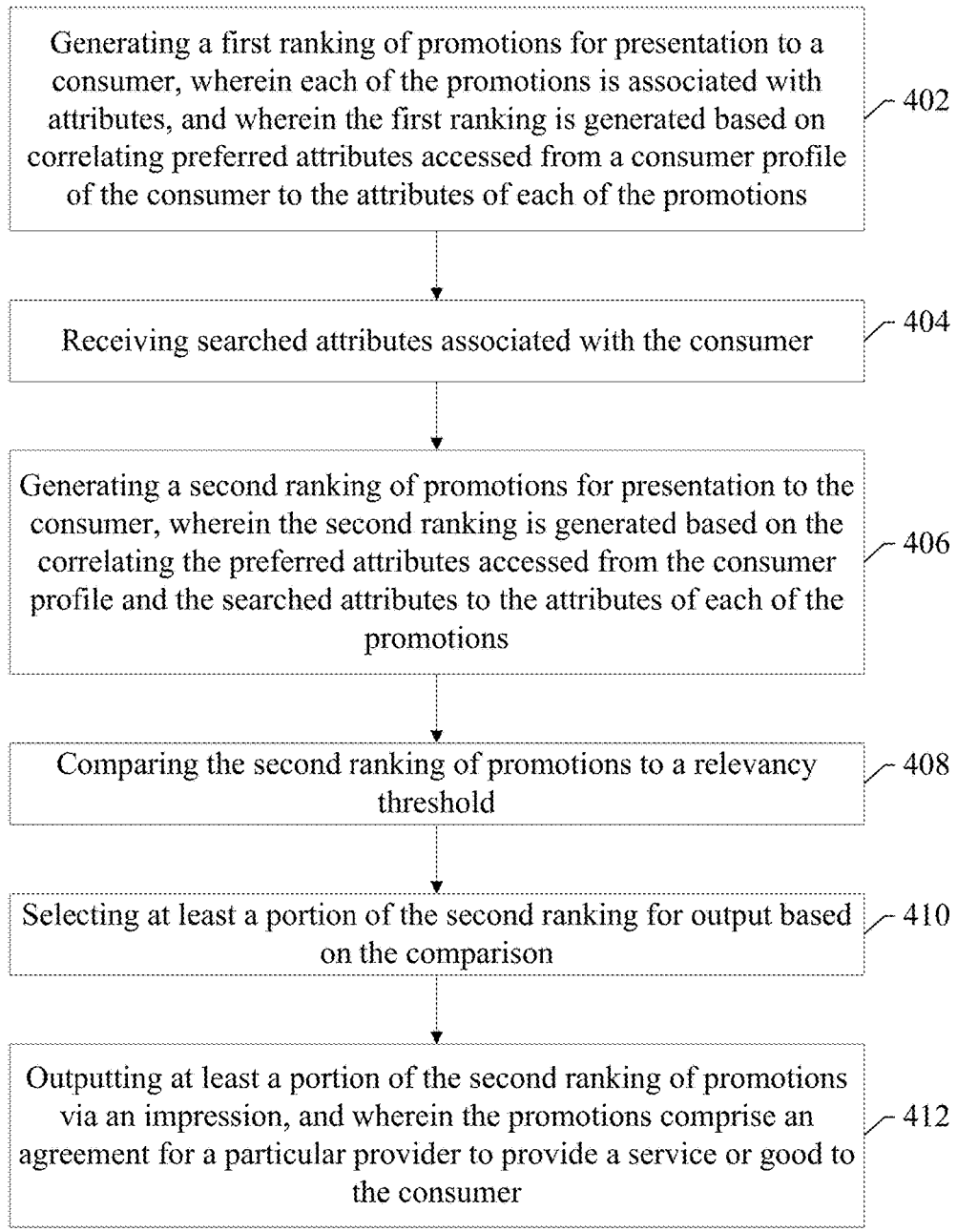
FIG. 4 is a flowchart illustrating a method for determining relevant promotions to provide to a consumer in accordance with an example embodiment.
Figure 5:
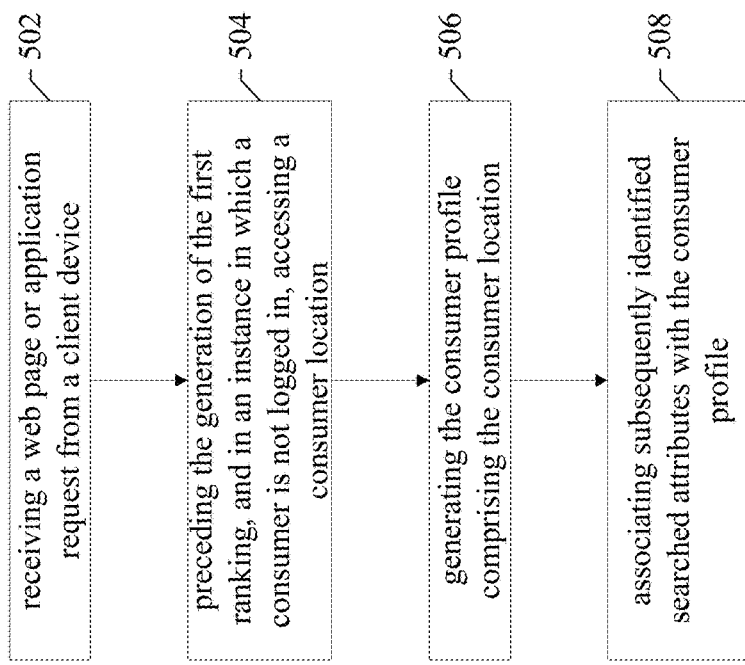
FIG. 5 is a flowchart illustrating a method for determining relevant promotions to provide to an unknown consumer in accordance with an example embodiment.

In some embodiments, searched attributes associated with a particular location may be utilized in adjusting the estimated number of units calculated to be sold for one or more of the virtual offers. As such, as shown in block 316 of FIG. 3, an apparatus, such as a demand forecasting module 116, may be configured for receiving searched attributes associated with a particular location. As shown in block 318 of FIG. 3, an apparatus, such as a demand forecasting module 116, may be configured for adjusting the estimated number of units to be sold for at least a portion of the one or more virtual offers based on the searched attributes associated with the particular location. In some embodiments, Relevance FIGS. 4 and 5 show example processes that may, in some embodiments, be executed by an example relevance module 118. The exemplary process shown below in FIG. 4 allows various embodiments of the present invention to provide promotions to a consumer that are relevant to that particular consumer. In other words, FIG. 4 shows a general process for selecting relevant promotions for outputting to, for example, a consumer via an impression.

In general, relevance may include an analysis to determine which promotion(s) to offer to the consumer for a product or a service. In some embodiments, a relevance system may be configured for determining which of a plurality of consumer promotions to present to a consumer. The plurality of promotions may be for goods and or for services. As such, the promotion offering system, including relevance module, may be configured to offer the consumer one or more promotions. The offer of the promotion may be made via an impression, such as for example, an electronic correspondence, which may take the form of an email, SMS text message, webpage inbox message, VOIP voice message, real-time webpage content presentation, mobile push notifications or other similar types of electronic correspondences. Depending on the type of impression, the impression may be presented to the consumer via a push (e.g., email) or pull (e.g., webpage).

The impression may include one or more promotions that are intended to be viewed by a targeted consumer. In order for the promotion offering system 102 to select the one or more promotions for the impression, the promotion offering system 102 may determine whether to offer particular promotion(s) to a targeted consumer. As such, as shown in block 402 of FIG. 4, an apparatus, such as relevance module 118, may be configured for generating a first ranking of promotions for presentation to a consumer. In some embodiments, each of the promotions is associated with attributes. In some embodiments, the first ranking may be generated based on correlating preferred attributes accessed from a consumer profile of the consumer to the attributes of each of the promotions.

For instance, the promotion offering system may determine whether to present promotion(s) by assigning a score according to any one of the methods disclosed in U.S. patent application Ser. No. 13/411,502 and U.S. Provisional Patent Application No. 61/644,352, both of which are incorporated by reference herein in their entireties. The promotion score may be, for example, an indication of a probability that the consumer will purchase the respective promotion. In addition or alternatively, the promotion score may be a representation of a relevance the respective promotion has with the consumer. The promotion score may be generated based on a combination of at least one of information identifying consumer and/or promotion attributes, consumer profiles/sub-profiles, consumer focused deal types and information identifying the past performance of promotions.

In some embodiments, after promotions are assigned their respective promotion scores, the highest scoring promotions may be selected for inclusion in the impression. However, in some embodiments, the relevance module may further utilize consumer search data, specifically, search attributes associated with the particular consumer and/or the consumer's location (as may be assumed or derived based on the location of a client device operated by the consumer or based on a location entered or confirmed by the consumer). As such, as shown in block 404 of FIG. 4, an apparatus, such as relevance module 118, may be configured for receiving search attributes associated with the consumer.

In some embodiments, impressions may be arranged in an array or gallery. Each position within the array or gallery may be designated with a level of desirability. For example, positions that are closer to the top of the array or gallery may be assigned a higher level of desirability than positions that are lower down on the array or gallery. In other words, when impressions are arranged in an array or gallery, those impressions associated with a higher level or desirability may be displayed in the positions closer to the top of the array or gallery. This is because a consumer that views the array or gallery has a greater likelihood of viewing impressions that are displayed at the top of the array or gallery than impressions that are displayed closer to the bottom. This behavior is exemplified by a consumer opening up an email and viewing impressions at the top of the email, but then losing interest in the contents of the email as the consumer scrolls progressively down the email. In this way, promotions having higher promotion scores may be assigned to impressions having positions within the array or gallery that have a higher level of desirability. Accordingly, as shown in block 406 of FIG. 4, an apparatus, such as relevance module 118, may be configured for generating a second ranking of promotions for presentation to the consumer, wherein the second ranking is generated based on the correlating the preferred attributes accessed from the consumer profile and the searched attributes to the attributes of each of the promotions.

In some embodiments, a number of promotions for inclusion in the impression may be set such that only the top number n of promotions having the highest promotion scores are included. In other embodiments, only those promotions meeting a predefined threshold are included. As such, as shown in block 408 of FIG. 4, an apparatus, such as relevance module 118, may be configured for comparing the second ranking of promotions to a relevancy threshold. Furthermore, as shown in block 410 of FIG. 4, an apparatus, such as relevance module 118, may be configured for selecting at least a portion of the second ranking for output based on the comparison.

As shown in block 412 of FIG. 4, an apparatus, such as relevance module 118, may be configured for outputting at least a portion of the second ranking of promotions via an impression, and wherein the promotions comprise an agreement for a particular provider to provide a service or good to the consumer.

In some embodiments, using promotion types ("PTs") enables better selection of promotions for consumers, as discussed in more detail below. In one embodiment, DTs are defined as a taxonomy of different from categories/subcategories. In particular, categories/subcategories are one type of taxonomy or classification, and PTs are another distinct type of taxonomy or classification. In still another embodiment, the PTs may be defined with respect to, or independent of, categories and/or subcategories. In one aspect, the definition of the PTs may be dependent on a category and/or subcategory. For example, one of the PTs may comprise "adrenaline". The PT for "adrenaline" may be defined based on a look-up table that correlates to particular subcategories, such as the subcategory "hot air balloons", the subcategory "skydiving", the subcategory "scuba diving", etc. In this way, the PTs may be defined based on multiple categories and/or subcategories. A PT may include, for example, a food interest group, outdoors interest group, home improvement interest group, children's related interest group, pampering and leisure interest group, pet enthusiast's interest group, healthy life style interest group, extreme sports interest group, traveling interest group, music and concert interest group and car enthusiast interest group among others. The examples given for PT are merely for illustration purposes. Other PTs are contemplated. Further discussion of PTs is included in U.S. patent application Ser. No. 13/829,581 entitled "Promotion Offering System", filed on Mar. 14, 2013, which is hereby incorporated by reference.

In some embodiments, relevance may be used to determine which promotions to provide to an unknown or unidentified consumer. For example, a consumer may visit a promotion and marketing system webpage or utilize an application without being registered and/or logged in. Instead of providing random promotions as the unknown consumer continues to navigate the webpage or application, embodiments of the present invention may utilize one or more attributes to build a consumer profile for the unknown consumer using for example, a location and subsequently identified searched attributes.

As such, FIG. 5 shows an example process that may be performed in conjunction with (e.g., prior to or in parallel with) the process shown in FIG. 4. As shown in block 502 of FIG. 5, an apparatus, such as relevance module 118, may be configured for receiving a web page or application request from a client device.

As shown in block 504 of FIG. 5, an apparatus, such as relevance module 118, may be configured for, preceding the generation of the first ranking, and in an instance in which a consumer is not logged in, accessing a consumer location. As shown in block 506 of FIG. 5, an apparatus, such as relevance module 118, may be configured for generating the consumer profile comprising the consumer location. As shown in block 508 of FIG. 5, an apparatus, such as relevance module 118, may be configured for associating subsequently identified searched attributes with the consumer profile.

Determining a Proposed Promotion

Figure 6:
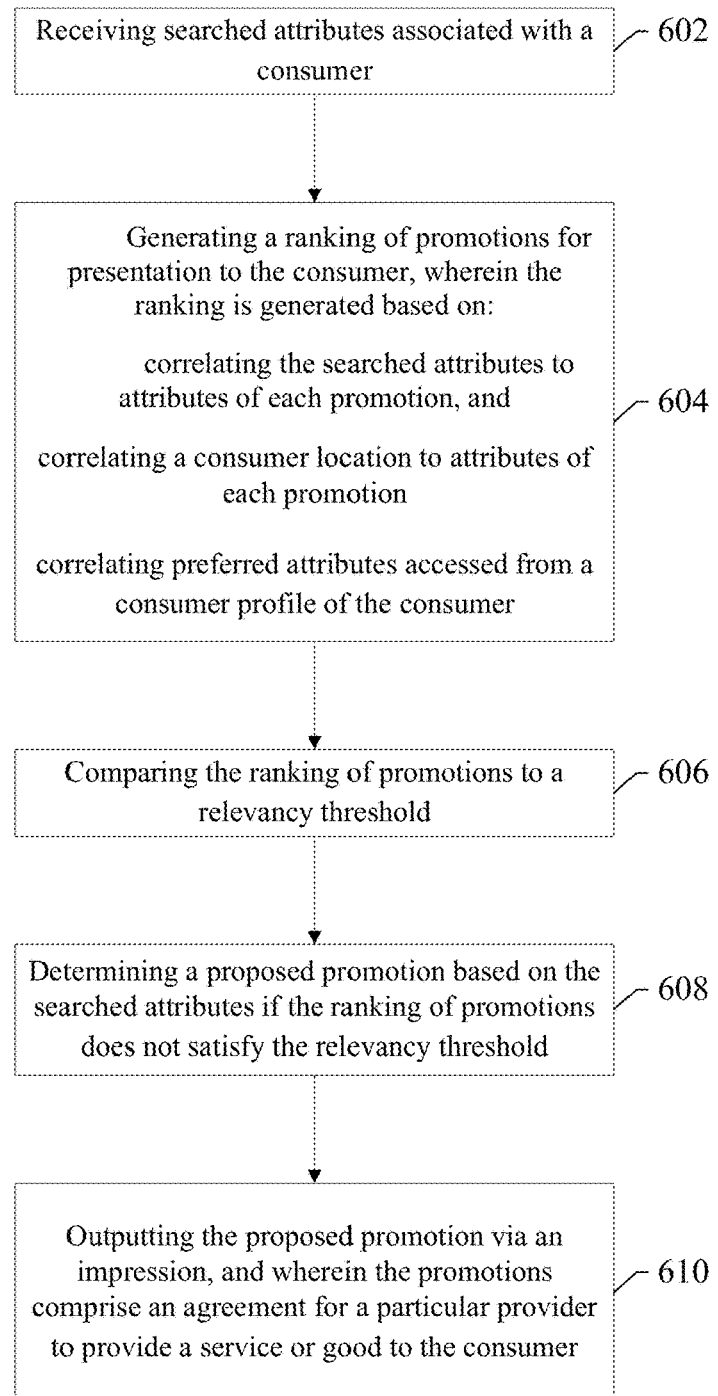
FIG. 6 is a flowchart illustrating a method for determining a proposed promotion to provide to a consumer in accordance with an example embodiment.

FIG. 6 shows an example process that may, in some embodiments, be executed by an example search feedback system 100. The exemplary process shown below allows various embodiments of the present invention to determine a proposed promotion utilizing searched attributes associated with a consumer in an instance in which, for example, a relevancy determination yields no results (e.g., no existing promotions meet a predefined threshold for relevancy).

As shown in block 602 of FIG. 6, an apparatus, such as relevance module 118, may be configured for receiving searched attributes associated with a consumer.

Once the searched attributes associated with the consumer are received, a ranking may be generated. As shown in block 602 of FIG. 6, an apparatus, such as relevance module 118, may be configured for generating a ranking of promotions for presentation to the consumer. In some embodiments, the ranking may be generated based on one or more of correlating the searched attributes to attributes of each promotion; correlating a consumer location to attributes of each promotion; or correlating preferred attributes accessed from a consumer profile of the consumer.

Once the ranking is generated, as shown in block 602 of FIG. 6, an apparatus, such as relevance module 118, may be configured for comparing the ranking of promotions to a relevancy threshold. In some embodiments, none of the promotions meet or exceed a predefined threshold. As such, as shown in block 602 of FIG. 6, an apparatus, such as relevance module 118, may be configured for determining a proposed promotion based on the searched attributes if the ranking of promotions does not satisfy the relevancy threshold. As shown in block 602 of FIG. 6, an apparatus, such as relevance module 118, may be configured for outputting the proposed promotion via an impression. In some embodiments, the promotions comprise an agreement for a particular provider to provide a service or good to the consumer.

Providing Access

Figure 7:
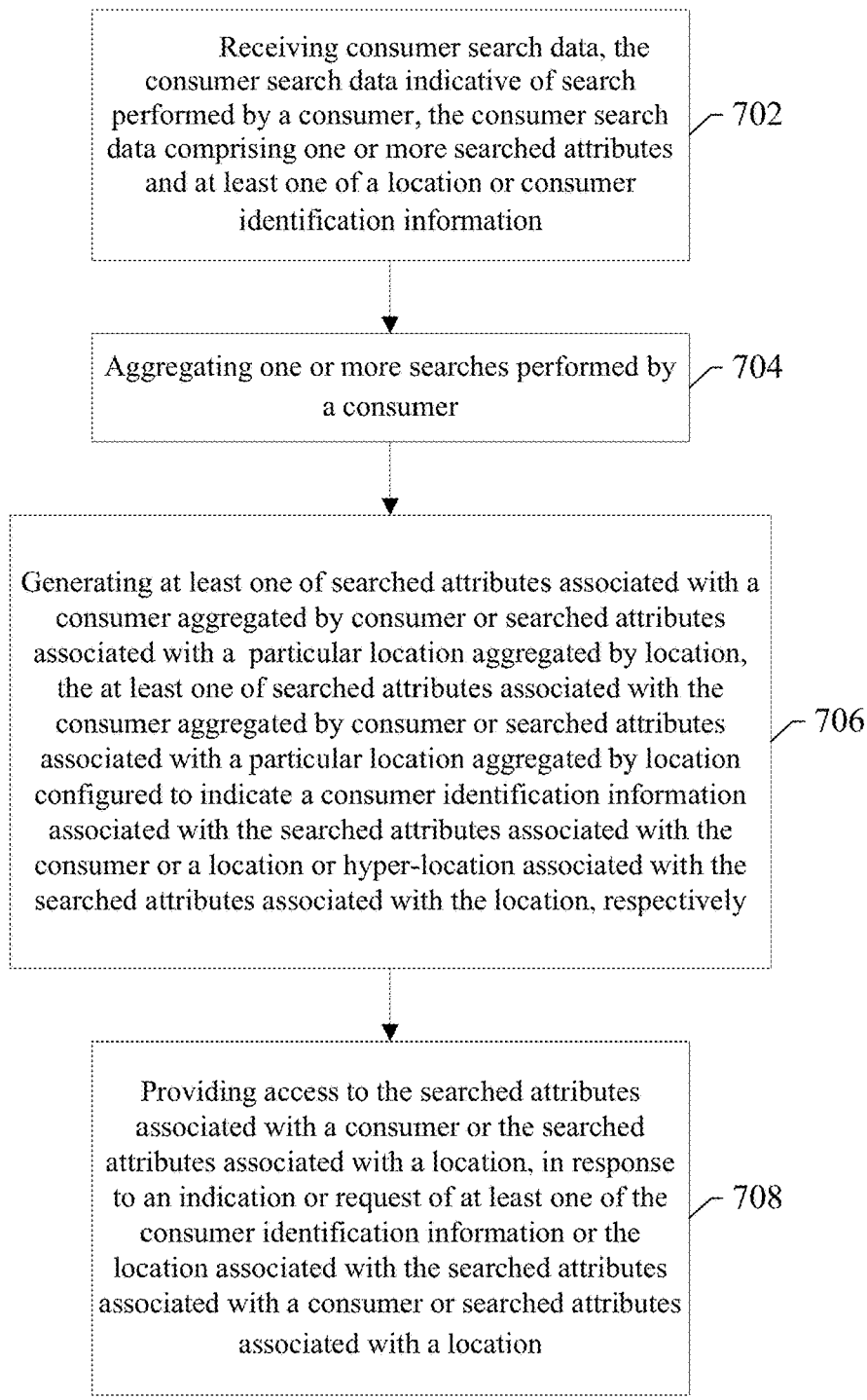
FIG. 7 is a flowchart illustrating a method for providing searched attributes to other modules of a search feedback system in accordance with an example embodiment.

FIG. 7 shows an example process that may, in some embodiments, be executed by an example search feedback system 100. The exemplary process shown below allows various embodiments of the present invention to generate and enable access to searched attributes associated with a particular consumer and/or searched attributes associated with a particular location. In some embodiments, the searched attributed associated with a particular consumer or location may be aggregated. Aggregation may be performed over a predefined period of time, at a predetermined interval, as new searched attributes are received or the like.

As shown in block 702 of FIG. 7, an apparatus, such as relevance module 118, may be configured for receiving consumer search data. In some embodiments, the consumer search data may be indicative of search performed by a consumer. The consumer search data may comprise one or more searched attributes associated with the consumer and/ or one or more searched attributes associated with a location. The consumer search data may additionally comprise at least one of a location or consumer identification information.

As shown in block 704 of FIG. 7, an apparatus, such as consumer search aggregation module 102, may be configured for aggregating one or more searches performed by a consumer. In some embodiments, the apparatus may be configured to aggregate one or more searches performed from a particular location.

As shown in block 704 of FIG. 7, an apparatus, such as consumer search aggregation module 102, may be configured for generating and/or storing at least one of searched attributes associated with a consumer aggregated by consumer or searched attributes associated with a particular location aggregated by location. In some embodiments, the at least one of searched attributes associated with the consumer aggregated by consumer or searched attributes associated with a particular location aggregated by location may be configured to indicate a consumer identification information associated with the searched attributes associated with the consumer or a location or hyper-location associated with the searched attributes associated with the location, respectively.

As shown in block 704 of FIG. 7, an apparatus, such as consumer search aggregation module 102, may be configured for providing access to or transmitting the searched attributes associated with a consumer or the searched attributes associated with a location, in response to an indication of at least one of the consumer identification information or the location associated with the searched attributes associated with a consumer or searched attributes associated with a location.

Computing Device Architecture

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

Figure 8:
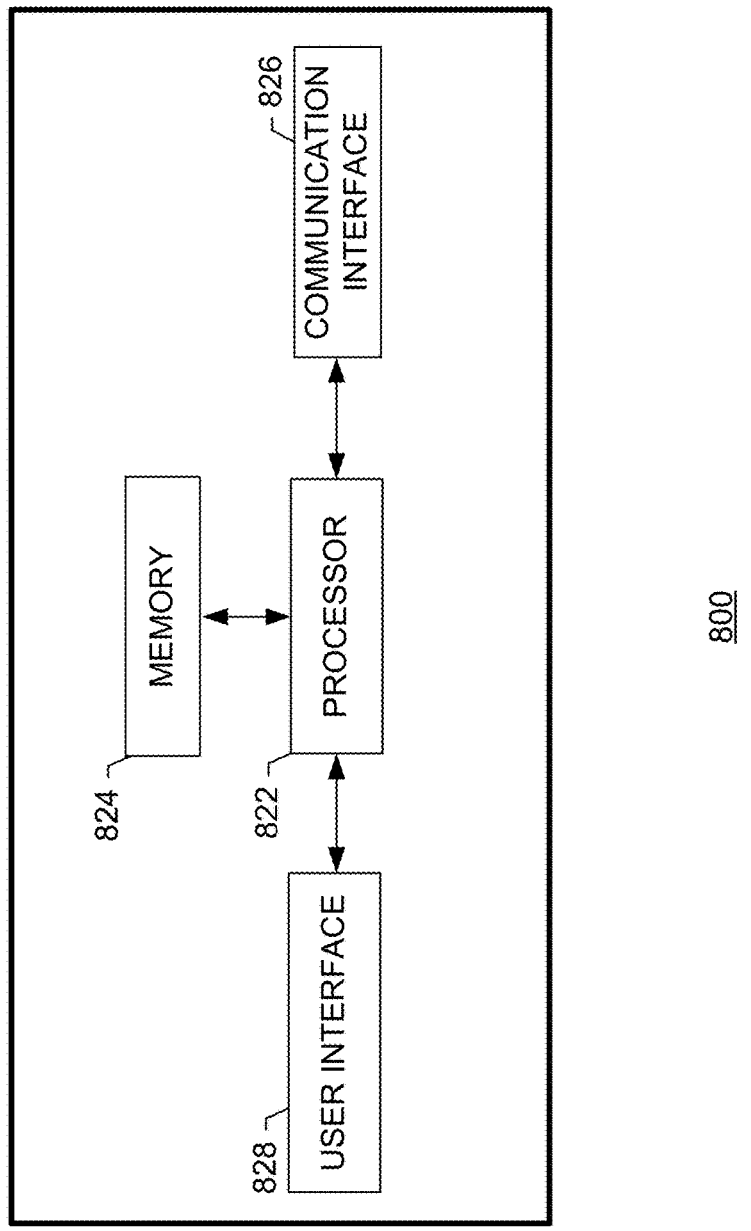
FIG. 8 is a block diagram of an apparatus that may be specifically configured in accordance with an example embodiment of the present invention.

For example, in reference to FIG. 8, one or more of the procedures described herein may be embodied by computer program instructions. In this regard, the computer program instructions which embody the procedures described above may be stored by a memory 824 of an apparatus employing an embodiment of the present invention and executed by a processor 822 in the apparatus.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions. In some embodiments, certain ones of the operations herein may be modified or further amplified. Moreover, in some embodiments additional optional operations may also be included. It should be appreciated that each of the modifications, optional additions or amplifications may be included with the operations, either alone or in combination with any others among the features described herein.

In some embodiments of the present invention, an apparatus, such as a system 100, the consumer search aggregation module 102, the consumer aggregation module 108, location aggregation module 112, demand forecasting module 116, and relevance module 118 may be embodied by a computing device. The computing device may include or be associated with an apparatus 800 as shown in FIG. 8. In this regard, the apparatus may include or otherwise be in communication with a processor 822, a memory device 824, a communication interface 826 and a user interface 828. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 822 (and/or co-processors or any other processing circuitry assisting or otherwise associated with the processor) may be in communication with the memory device 824 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 800 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 800 may be embodied by the consumer search aggregation module 102 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 822 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 822 may be configured to execute instructions stored in the memory device 824 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 828.

Meanwhile, the communication interface 826 may be any means such as a device or circuitry embodied in either hardware or a combination of hardware and software that is configured to receive and/or transmit data between the client device 118a-118b, search system 120, the consumer search aggregation module 102, demand forecasting module 112, and/or relevance module 114. In this regard, the communication interface 826 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 828 may be in communication with the processor 822, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 824 and/or the communication interface 826, such as via a bus.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Referring back to FIG. 1, which shows an example block diagram for practicing embodiments of a search feedback system 100 and/or consumer search aggregation module 102. Note that one or more general purpose or special purpose computing systems/devices may be used to implement the consumer search aggregation module 102. In addition, the consumer search aggregation module 102 may comprise one or more distinct computing systems/devices and may span distributed locations. Furthermore, each block shown may represent one or more such blocks as appropriate to a specific embodiment or may be combined with other blocks. For example, in some embodiments the consumer search aggregation module 102 may contain a search data receiver 104, a search data database 106, a user search data aggregation module 108, a location search data aggregation module 110, or a combination thereof. In other example embodiments, the search data receiver 104, the search data database 106, the user search data aggregation module 108, and the location search data aggregation module 110 may be configured to operate on separate systems (e.g. a mobile terminal and a remote server, multiple remote servers and/or the like). For example, the search data receiver 104, the search data database 106, the user search data aggregation module 108, and the location search data aggregation module 110 may be configured to operate on a mobile terminal. Also, search feedback system 100 and/or consumer search aggregation module 102 may be implemented in software, hardware, firmware, or in some combination to achieve the capabilities described herein.

While the search feedback system 100 and/or consumer search aggregation module 102 may be employed, for example, by a mobile terminal, or stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, search feedback system 100 and/or consumer search aggregation module 102 comprises a computer memory ("memory") 824, one or more processors 822 (e.g. processing circuitry) and a communications interface 828. The computing device(s) are shown residing in memory 824. In other embodiments, some portion of the contents, some or all of the components of the search feedback system 100 and/or consumer search aggregation module 102 may be stored on and/or transmitted over other computer-readable media. The components of the search feedback system 100 and/or consumer search aggregation module 102 preferably execute on one or more processors 822 and are configured for receiving, storing, and aggregating, consumer search data and providing the aggregated consumer search data to a relevance module and demand forecasting module. Other code or programs (e.g., an administrative interface, a Web server, and the like) and potentially other data repositories may also reside in the memory 824, and preferably execute on processor 822. Of note, one or more of the components in FIG. 1 may not be present in any specific implementation.

In a typical embodiment, the search feedback system 100 and/or consumer search aggregation module 102 interacts via a network via a communications interface 826 with mobile client devices 118a-118n. The network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 826 may be capable of operating with one or more air interface standards, communication protocols, modulation types, access types, and/or the like.

In an example embodiment, components/modules of the search feedback system 100 and/or consumer search aggregation module 102 may be implemented using standard programming techniques. For example, the search feedback system 100 and/or consumer search aggregation module 102 may be implemented as a "native" executable running on the processor 822, along with one or more static or dynamic libraries. In other embodiments, the search feedback system 100 and/or consumer search aggregation module 102 may be implemented as instructions processed by a virtual machine that executes as one of the other programs. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the system 100, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the search feedback system 100 and/or consumer search aggregation module 102 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page, "mobile app", or "app" may be performed by a web browser on a mobile client device. An HTML5 or JavaScript™ "app" allows web page script to contact a server for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for improved demand forecasting utilizing searched attributes derived from a consumer's browsing activity including icon selection, navigation of a hierarchal structure presented as a website or app, and location, the method comprising:

generating a virtual offer for one or more combinations of a category or sub-category, location, and price range;

deriving a first portion of searched attributes from data that is received as input upon icon selection at a consumer facing user interface;

accessing and pre-populating a second portion of the searched attributes upon receiving global positioning system (GPS) data indicative of a location from a consumer device;

implicitly inferring a third portion of the searched attributes as a function of user browsing activity, the user browsing activity being navigation of a hierarchical data structure, the data structure organized by location and hyper-location or category and sub-category;

storing, for each of one or more consumers, each of the first portion, the second portion, and third portion of the searched attributes;

accessing, for each of one or more consumers, consumer data accessed from a consumer profile of the consumer, wherein the consumer data comprises searched attributes associated with the consumer, wherein each portion of the searched attributes derived from the data received as input upon icon selection is associated with at least one second portion indicative of a GPS location, and wherein each third portion of searched attributes implicitly inferred as a function of user browser activity also is associated with at least one second portion indicative of a GPS location;

calculating a probability that a particular consumer would buy a particular offer in a particular time frame for at least a portion of the plurality of consumers and for each of the virtual offers;

determining an estimated number of units to be sold for at least a portion of the one or more virtual offers as a function of at least the probability associated with each of the one or more virtual offers;

generating promotions, each representative of an offer for sale of an actual product or service from an actual merchant, comprised of attributes configured to be matched to the searched attributes, from among the one or more virtual offers having an estimated number of units to be sold that meets a predetermined threshold; and causing display of a particular page layout on a user interface of a consumer device associated with the consumer, the particular page layout comprised of the promotions matching the searched attributes associated with the consumer and the consumer device, the particular page layout configured as a function of specifications of the consumer device, a detected specific location, and consumer preferences.

2. The method of claim 1, further comprising:
receiving searched attributes associated with a particular location;
adjusting the estimated number of units to be sold for at least a portion of the one or more virtual offers based on the searched attributes associated with the particular location.

3. The method of claim 1, further comprising:
subsequent to calculating the probability, generating a ranking of the calculated probability calculations; and
comparing the ranking to a relevancy threshold; and
determining the estimated number of units to be sold for a portion meeting or exceeding the relevancy threshold.

4. The method of claim 3, further comprising:
subsequent to calculating the probability, generating a ranking of the calculated probability calculations; and
comparing the ranking to a pre-selected portfolio mix; and
determining the estimated number of units to be sold for a portion based on the ranking and the pre-selected portfolio mix.

5. An apparatus configured for improved demand forecasting utilizing searched attributes derived from a consumer's browsing activity including icon selection, navigation of a hierarchal structure presented as a website or app, and location, the apparatus comprising at least one processor and at least one memory including computer program code, the at least one memory and the computer program code configured to, with the processor, cause the apparatus to at least:
generate a virtual offer for one or more combinations of a category or sub-category, location, and price range;
derive a first portion of searched attributes from data that is received as input upon icon selection at a consumer facing user interface;
access and pre-populating a second portion of the searched attributes upon receiving global positioning system (GPS) data indicative of a location from a consumer device;
implicitly infer a third portion of the searched attributes as a function of user browsing activity, the user browsing activity being navigation of a hierarchical data structure, the data structure organized by location and hyperlocation or category and sub-category;
storing, for each of one or more consumers, each of the first portion, the second portion, and third portion of the searched attributes;
access, for each of one or more consumers, consumer data accessed from a consumer profile of the consumer, wherein the consumer data comprises searched attributes associated with the consumer,
wherein each portion of the searched attributes derived from the data received as input upon icon selection is associated with at least one second portion indicative of a GPS location, and wherein each third portion of searched attributes implicitly inferred as a function of user browser activity also is associated with at least one second portion indicative of a GPS location;
calculate a probability that a particular consumer would buy a particular offer in a particular time frame for at least a portion of the plurality of consumers and for each of the virtual offers;
determine an estimated number of units to be sold for at least a portion of the one or more virtual offers as a function of at least the probability associated with each of the one or more virtual offers; and
generate promotions, each representative of an offer for sale of an actual product or service from an actual merchant, comprised of attributes configured to be matched to the searched attributes, from among the one or more virtual offers having an estimated number of units to be sold that meets a predetermined threshold; and
cause display of a particular page layout on a user interface of a consumer device associated with the consumer, the particular page layout comprised of the promotions matching the searched attributes associated with the consumer and the consumer device, the particular page layout configured as a function of specifications of the consumer device, a detected specific location, and consumer preferences.

6. The device of claim 5, the device further comprising processing circuitry configured to:
receive searched attributes associated with a particular location;
adjust the estimated number of units to be sold for at least a portion of the one or more virtual offers based on the searched attributes associated with the particular location.

7. The device of claim 5, the device further comprising processing circuitry configured to:
subsequent to calculating the probability, generate a ranking of the calculated probability calculations; and
compare the ranking to a relevancy threshold; and
determine the estimated number of units to be sold for a portion meeting or exceeding the relevancy threshold.

8. The device of claim 7, the device further comprising processing circuitry configured to:
subsequent to calculating the probability, generate a ranking of the calculated probability calculations; and
compare the ranking to a pre-selected portfolio mix; and
determine the estimated number of units to be sold for a portion based on the ranking and the pre-selected portfolio mix.

9. A computer program product configured for improved demand forecasting utilizing searched attributes derived from a consumer's browsing activity including icon selection, navigation of a hierarchal structure presented as a website or app, and location, the computer program product comprising at least one non-transitory computer-readable storage medium having computer-executable program code instructions stored therein, the computer-executable program code instructions comprising program code instructions for:

generating a virtual offer for one or more combinations of a category or sub-category, location, and price range;

deriving a first portion of searched attributes from data that is received as input upon icon selection at a consumer facing user interface;

accessing and pre-populating a second portion of the searched attributes upon receiving global positioning system (GPS) data indicative of a location from a consumer device;

implicitly inferring a third portion of the searched attributes as a function of user browsing activity, the user browsing activity being navigation of a hierarchical data structure, the data structure organized by location and hyper-location or category and sub-category;

storing, for each of one or more consumers, each of the first portion, the second portion, and third portion of the searched attributes;

accessing, for each of one or more consumers, consumer data accessed from a consumer profile of the consumer, wherein the consumer data comprises searched attributes associated with the consumer, wherein each portion of the searched attributes derived from the data received as input upon icon selection is associated with at least one second portion indicative of a GPS location, and wherein each third portion of searched attributes implicitly inferred as a function of user browser activity also is associated with at least one second portion indicative of a GPS location;

calculating a probability that a particular consumer would buy a particular offer in a particular time frame for at least a portion of the plurality of consumers and for each of the virtual offers;

determining an estimated number of units to be sold for at least a portion of the one or more virtual offers as a function of at least the probability associated with each of the one or more virtual offers; and generating promotions, each representative of an offer for sale of an actual product or service from an actual merchant, comprised of attributes configured to be matched to the searched attributes, from among the one or more virtual offers having an estimated number of units to be sold that meets a predetermined threshold; and causing display of a particular page layout on a user interface of a consumer device associated with the consumer, the particular page layout comprised of the promotions matching the searched attributes associated with the consumer and the consumer device, the particular page layout configured as a function of specifications of the consumer device, a detected specific location, and consumer preferences.

10. The computer program product according to claim 9, wherein the computer-executable program code instructions further comprise program code instructions for: receiving searched attributes associated with a particular location; adjusting the estimated number of units to be sold for at least a portion of the one or more virtual offers based on the searched attributes associated with the particular location.

11. The computer program product according to claim 9, wherein the computer-executable program code instructions further comprise program code instructions for:

subsequent to calculating the probability, generating a ranking of the calculated probability calculations; and comparing the ranking to a relevancy threshold; and determining the estimated number of units to be sold for a portion meeting or exceeding the relevancy threshold.

12. The computer program product according to claim 11, wherein the computer-executable program code instructions further comprise program code instructions for:

subsequent to calculating the probability, generating a ranking of the calculated probability calculations; and comparing the ranking to a pre-selected portfolio mix; and determining the estimated number of units to be sold for a portion based on the ranking and the pre-selected portfolio mix.

\* \* \* \* \*